United States Patent [19]

Wada et al.

[11] Patent Number: 5,757,610

[45] Date of Patent: May 26, 1998

[54] DIELECTRIC CERAMIC AND MONOLITHIC CERAMIC ELECTRONIC PART USING THE SAME

[75] Inventors: Nobuyuki Wada; Hidehiko Tanaka, both of Shiga-ken; Yukio Hamaji, Otsu; Harunobu Sano, Kyoto, all of Japan

[73] Assignee: Murata Manufacturing Co., Ltd., Kyoto-fu, Japan

[21] Appl. No.: 813,327

[22] Filed: Mar. 7, 1997

[30] Foreign Application Priority Data

Mar. 8, 1996 [JP] Japan ................................ 8-051800
Mar. 8, 1996 [JP] Japan ................................ 8-051801

[51] Int. Cl.$^6$ ............................................ H01G 4/06
[52] U.S. Cl. ................ 361/311; 361/321.5; 501/134; 501/137
[58] Field of Search ........................ 361/311, 320, 361/321.2, 321.4, 321.5, 306.1, 309, 310, 321.1; 501/134, 135, 136, 137, 138, 152, 153, 154, 32; 264/61, 65

[56] References Cited

U.S. PATENT DOCUMENTS

| | | | |
|---|---|---|---|
| 4,115,493 | 9/1978 | Sakabe et al. ........................ | 264/61 |
| 4,604,676 | 8/1986 | Senda et al. ........................ | 361/309 |
| 5,264,402 | 11/1993 | Sano et al. ........................ | 501/137 |
| 5,268,342 | 12/1993 | Nishiyama et al. ................. | 501/138 |
| 5,310,709 | 5/1994 | Wada et al. ........................ | 501/134 |
| 5,322,828 | 6/1994 | Sano et al. ........................ | 501/137 |
| 5,439,857 | 8/1995 | Iwamoto et al. ................... | 501/136 |
| 5,510,305 | 4/1996 | Sano et al. ........................ | 501/138 |
| 5,631,624 | 5/1997 | Kanba et al. ....................... | 338/309 |

*Primary Examiner*—Kristine L. Kincaid
*Assistant Examiner*—Anthony Dinkins
*Attorney, Agent, or Firm*—Ostrolenk, Faber, Gerb & Soffen, LLP

[57] ABSTRACT

The present invention provides a nonreducing dielectric ceramic including a sintered compact composed of a plurality of particles expressed by a maximum diameter of about 0.5 μm and an average diameter of about 0.1 to 0.3 μm, each of the plurality of particles having a uniform composition and a uniform crystal system, and individual particles having the same composition and crystal system. A compact monolithic electronic part with high-reliability can be realized by using such ceramic.

19 Claims, 1 Drawing Sheet

DIELECTRIC CERAMIC AND MONOLITHIC CERAMIC ELECTRONIC PART USING THE SAME

BACKGROUND OF THE INVENTION

1. Field of the Invention

The present invention relates to dielectric ceramics and monolithic ceramic electronic parts using the same, such as multilayer ceramic capacitors and multilayer ceramic substrates.

2. Description of the Related Art

With the rapid miniaturization and low cost trend of monolithic ceramic electronic parts, thinner ceramic layers and use of base metals as internal electrodes have become common. For example, in multilayer ceramic capacitors which are one of many monolithic ceramic electronic parts, ceramic layers have been thinned to almost 5 µm, and copper and/or nickel have been used as internal electrodes.

However, such thin ceramic layers cause high electric fields within the ceramic layers and cannot be used in dielectrics which have large variances in dielectric constant in electric fields. As one approach to solve this drawback, ceramic core-shell structures have been proposed and used have been particles composed of a sintered compact, in which the core and shell have different compositions and crystal structures. Such core-shell ceramics exhibit superior electric field and temperature characteristic dielectric constants. In core-shell ceramics, essential components are implanted by diffusion from the surface to the inside of each particle during the sintering processes.

As set forth above, conventional core-shell dielectrics have been produced by diffusion of essential components from the surface of each particle during the sintering process. When using finer particles as a raw material, components for forming the shell also diffuse into the center of the particle. As a result, the characteristic core-shell structure does not form. In accordance with the conventional technique, the minimum particle size in the sintered compact being capable of forming the core-shell structure is approximately 1 µm.

When a core-shell dielectric is used as a ceramic layer having a thickness of no greater than 5 µm, in a monolithic ceramic electronic part, the number of particles which exist in the direction perpendicular to the layers decrease, and thus the monolithic ceramic electronic part is less reliable. Accordingly, the development of thinner ceramic layers for monolithic ceramic electronic parts has reached its limit.

SUMMARY OF THE INVENTION

It is an object of the present invention to provide a dielectric ceramic exhibiting a superior temperature and electric field characteristic dielectric constant, in which the sintered compact comprises small non-core-shell particles.

It is another object of the present invention to provide a monolithic ceramic electronic part comprising thin ceramic layers each having a thickness of 3 µm or less.

In accordance with one aspect of the present invention, a dielectric ceramic comprises a sintered compact composed of a plurality of particles expressed by a maximum diameter of about 0.5 µm, preferably about 0.4 µm, and an average diameter of about 0.1 to 0.3 µm, preferably about 0.15 to 0.25 µm.

In accordance with a second aspect of the present invention, each of the plurality of particles has a uniform composition and a uniform crystal system, and the individual particles have the same composition and crystal system.

In accordance with the third aspect of the present invention, the dielectric ceramic further comprises a grain boundary phase having a different composition from said particles.

In accordance with the fourth aspect of the present invention, the thickness of the grain boundary phase is about 5 nm or less.

In accordance with the fifth aspect of the present invention, each of the plurality of particles can have a uniform composition and a uniform crystal system, and the sintered compact can comprise at least two kinds of particles having different compositions.

Since the average diameter of particles in the sintered compact is small, i.e., about 0.1 to 0.3 µm, as set forth above, many particles can be stacked with each other in the direction perpendicular to the layer even in a thin layer of about 5 µm or less, resulting in high reliability of the ceramic layer.

In the second and fifth aspect, the ceramic structure is stable during sintering process since each particle of the sintered compact has a uniform composition and crystal system. Further, its small particle size suppresses the dielectric characteristics of the ceramic and results in superior electric field and temperature characteristics.

In conventional core-shell structures, the difference in the temperature characteristics of the dielectric constant between the core and shell is achieved with difficulty by adjusting the thickness of the shell diffusion layer which is formed during sintering. In contrast, the temperature characteristics can be readily adjusted by varying the volume ratio of at least two kinds of fine particles having different compositions and dielectric constants, resulting in improvement in quality and reproducibility of the sintered compacts in the fifth aspect. "Particles having different compositions" include particles having different components and particles having the same components but different ratios. By using particles having different compositions and suppressing interdiffusion and particle growth, excellent electric field and temperature characteristics can be achieved.

In accordance with the fifth aspect, a grain boundary phase having a different composition from the particles and a thickness of about 5.0 nm or less is present between the particles in the sintered compact. Thus, the electric field concentrates in the grain boundary phase and the electric field applied to the particles themselves is suppressed, resulting in high particle reliability. Since oxygen diffuses at a high rate within the grain boundary and compensates for oxygen defects which cause low reliability, the reliability is not reduced by concentration of the electric field in the grain boundary. However, in a grain boundary phase of over 5 nm, a grain boundary having a lower dielectric constant than the particles causes a large decrease in the dielectric constant of the entire ceramic.

DESCRIPTION OF THE PREFERRED EMBODIMENTS

Figure 1:
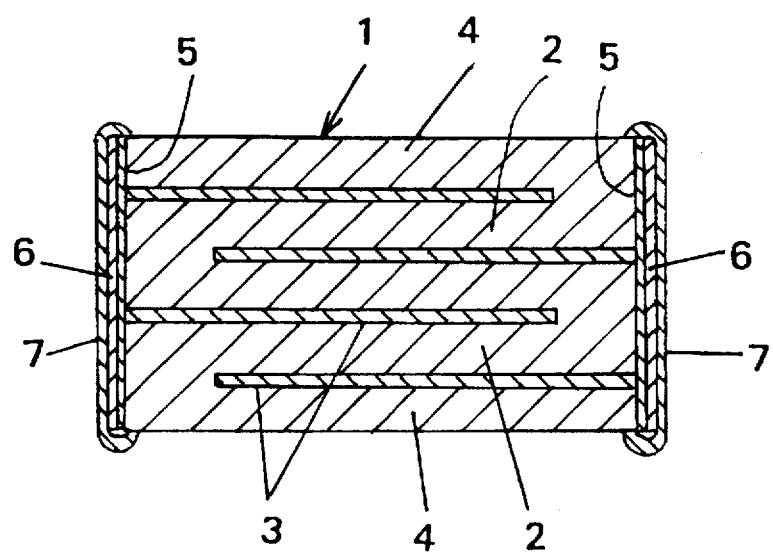
FIG. 1 is a cross-sectional view of a multilayer ceramic capacitor as an embodiment in accordance with the present invention.

A dielectric ceramic in accordance with the present invention and a monolithic ceramic electronic part which uses it will be illustrated with reference to an exemplified multilayer ceramic capacitor. In the embodiment, a base metal is used for an internal electrode of the monolithic electronic ceramic part to reduce cost. Thus, nonreducing dielectric materials, such as those having a stoichiometric shift toward the A site in the general formula $ABO_3$, for example, in barium titanate, and addition of an acceptor element, are used. However, other types of electrodes and ceramic can be used.

As shown in FIG. 1, the exemplified multilayer ceramic capacitor is of a rectangular parallelepiped chip type and comprises a laminate 1 which is prepared by laminating a plurality of dielectric ceramic layers 2, internal electrodes 3 as internal conductors intercalated between the dielectric ceramic layers 2, and external conductors provided at both ends of the laminate. Each external conductor consists of an external electrode 5, a plated film 6 such as nickel, copper or the like, and a plated film 7 such as solder, tin or the like.

The multilayer ceramic capacitor is produced as follows: A main component such as barium titanate and an additive for modifying the capacitor characteristics as starting materials are weighed according to a given recipe and wet-mixed. An organic binder and a solvent are added to the powder mixture to obtain a slurry, and a ceramic green sheet is made from the slurry. An internal electrode layer comprising a base metal such as copper is provided on the ceramic green sheet, for example, by screen printing, evaporation or plating.

A predetermined number of ceramic green sheets with internal electrode layers are laminated, and two ceramic green sheets without internal electrode layers are provided at the external surfaces of the laminated sheets.

These are pressed to obtain a laminate 1. The laminate 1 is sintered in a reducing atmosphere at a predetermined temperature.

At both ends of the laminate 1, external electrodes 5 are formed so as to connect with the internal electrodes 3. Materials for the external electrode 5 may be the same as those for the internal electrode 3. Alternatively, usable materials may include metals and alloys, e.g. silver, palladium, silver-palladium alloys, copper, and copper alloys. These metal and alloy powders may contain glass frits such as $B_2O_3SiO_2$—BaO glass and $Li_2O$—$SiO_2$—BaO glass. An appropriate material is selected in consideration of the intended usage and environment.

The external electrodes 5 are generally formed by coating a raw metal paste on the as-sintered laminate 1, followed by baking. Alternatively, the paste may be coated on the non-sintered laminate 1 and baked during sintering.

Plating films 6 of copper or nickel are formed on the external electrodes 5, and then plating films 7 of silver or the like are formed thereon to prepare a chip type multilayer ceramic capacitor.

EXAMPLES

Sample Nos. 1 through 7

After an appropriate amount of organic solvent was added to starting materials based on the formulations (mole ratios) shown in Table 1, the starting materials were mixed while powdering in a resinous pot with 2 mm$\phi$ zirconia powdering media. In Table 1, Sample Nos. 1 through 7 indicate examples in accordance with the present invention.

TABLE 1

| | Sample number | Starting materials | | mole ratio | Sintering temp. (°C.) | Particle size (μm) Average | Particle size (μm) Maximum | Grain boundary phase thickness (nm) |
|---|---|---|---|---|---|---|---|---|
| Examples | 1 | 0.1 μm $BaTiO_3$ by hydrothermal crystallization | | 100 | 1100 | 0.15 | 0.3 | — |
| | | Soluble Mn compound | Mn | 0.5 | | | | |
| | 2 | 0.2 μm $BaTiO_3$ by hydrolytic synthesis | | 100 | 1150 | 0.2 | 0.3 | — |
| | | Soluble Mn compound | Mn | 0.5 | | | | |
| | | Soluble Mg compound | Mg | 0.5 | | | | |
| | 3 | 0.3 μm $BaTiO_3$ by hydrothermal crystallization | | 100 | 1150 | 0.3 | 0.4 | — |
| | | $MnCO_3$ | | 0.5 | | | | |
| | 4 | 0.2 μm $BaTiO_3$—$CaTiO_3$ by hydrolytic synthesis | | 100 | 1150 | 0.3 | 0.5 | — |
| | | Soluble Mn compound | Mn | 0.5 | | | | |
| | 5 | 0.2 μm $BaTiO_3$ by hydrothermal crystallization | | 100 | 1000 | 0.2 | 0.4 | 0.5 |
| | | $MnCO_3$ | | 0.5 | | | | |
| | | Li—Ba—Si glass | | 1.0 | | | | |
| | 6 | 0.25 μm $Ba(Zr,Ti)O_3$ by solid phase reaction | | 100 | 1050 | 0.25 | 0.5 | 1.0 |
| | | $MnCO_3$ | | 0.5 | | | | |
| | | Soluble Li—Ba—Si compound | | 1.0 | | | | |
| | 7 | 0.3 μm $BaTiO_3$ by solid phase reaction | | 100 | 1000 | 0.3 | 0.5 | 5.0 |
| | | Soluble Mn compound | Mn | 0.5 | | | | |
| | | Soluble B—Ba—Si compound | | 5.0 | | | | |
| Comparative Examples | 8 | 0.1 μm $BaTiO_3$ by hydrothermal crystallization | | 100 | 1200 | 0.3 | 0.6 | — |
| | | Soluble Mn compound | Mn | 0.5 | | | | |
| | 9 | 0.2 μm $BaTiO_3$ by hydrothermal crystallization | | 100 | 1200 | 0.5 | 0.6 | — |
| | | $MnCO_3$ | | 0.5 | | | | |
| | | Li—Ba—Si glass | | 1.0 | | | | |
| | 10 | 0.3 μm $BaTiO_3$ by solid phase reaction | | 100 | | | | |
| | | Soluble Mn compound | Mn | 0.5 | 1000 | 0.3 | 0.5 | 7.0 |
| | | Soluble B—Ba—Si compound | | 6.0 | | | | |

The starting materials in each sample are as follows:

In Sample No. 1, barium titanate ($BaTiO_3$) which was prepared by a hydrothermal crystallization method with an average particle size of 0.1 μm and a Mn compound soluble in the organic solvent used in the mixing/powdering process were used as starting materials.

In Sample No. 2, barium titanate ($BaTiO_3$) which was prepared by hydrolytic reaction followed by calcination with an average particle size of 0.2 μm and Mn and Mg compounds soluble in the organic solvent used in the mixing/powdering process were used as starting materials.

In Sample No. 3, barium titanate ($BaTiO_3$) which was prepared by a hydrothermal crystallization method with an average particle size of 0.3 μm and fine manganese carbonate powder were used as starting materials.

In Sample No. 4, barium titanate ($BaTiO_3$) and calcium titanate ($CaTiO_3$) which had been prepared by hydrolytic reaction were mixed at a mole ratio of 9:1 and were calcinated to obtain a powder mixture having an average particle size of 0.2 μm. The powder mixture and a Mn compound soluble in the organic solvent used in the mixing/powdering process were used as starting materials.

In Sample No. 5, barium titanate ($BaTiO_3$) prepared by a hydrothermal crystallization method having an average particle size of 0.2 μm, fine manganese carbonate powder and fine Li—Ba—Si glass were used as starting materials.

In Sample No. 6, barium titanate zirconate {$Ba(Zr,Ti)O_3$} prepared by solid phase reaction having an average particle size of 0.25 μm, fine manganese carbonate powder and a Li—Ba—Si compound soluble in the organic solvent used in the mixing/powdering process were used as starting materials, in which the barium titanate zirconate was prepared by mixing barium carbonate, titanium oxide and zirconium oxide so that the mole ratio of Ba/(Ti+Zr) was 1 and that of Ti/Zr was 7/3, followed by calcinating at 1,100° C. and powdering.

In Sample No. 7, barium titanate ($BaTiO_3$) prepared by solid phase reaction having an average diameter of 0.3 μm, a Mn compound and a B—Ba—Si compound which were soluble in the organic solvent used in the mixing/powdering process were used as starting materials, in which the barium titanate was prepared by mixing barium carbonate and titanium oxide so that the mole ratio of Ba/Ti was 1, followed by calcinating and powdering.

Compounds soluble in an organic solvent include alkoxides and acetylacetonates of the corresponding metals and metal soaps.

A slurry was prepared by adding a predetermined amount of organic binder to each powdered mixture and shaped into a thin ceramic sheet on an organic film with a doctor blade so that the thickness after sintering was 2 μm. Next, a conductive layer essentially consisting of nickel was formed on the ceramic green sheet by printing. Six ceramic green sheets with conductive layers were overlapped such that extraction sites of their conductive layers alternate and were intercalated with two ceramic green sheets without internal electrodes to form a laminate.

The laminate was heated in a nitrogen atmosphere to remove the binder and sintered in a reducing atmosphere at the sintering temperature as shown in Table 1 to form a ceramic sintered compact. A silver paste containing glass frit was coated and baked on both sides of the ceramic sintered compact to provide external electrodes. A multilayer ceramic capacitor comprising nonreducing dielectric ceramic layers was prepared in such a manner.

Comparative Examples: Sample Nos. 8 through 10

After an appropriate amount of organic solvent was added to starting materials based on the formulations (mole ratios) shown in Table 1, the starting materials were mixed while powdering in a resinous pot with 2 mmφ zirconia powdering media. In Table 1, Sample Nos. 8 through 10 indicate comparative examples.

In Sample No. 8, the same starting materials as Sample No. 1 were used. In Sample No. 9, the starting materials were the same as Sample No. 5. Although the same starting materials as Sample No. 7 were used in Sample No. 10, the amount of the B—Ba—Si compound was different from Sample No. 7. Multilayer ceramic capacitors comprising nonreducing dielectric ceramic layers were prepared at sintering temperatures shown in Table 1 under the same conditions as in the Examples.

Particles and grain boundaries of the resulting multilayer ceramic capacitors in the Examples and Comparative Examples were observed. Each multilayer ceramic capacitor was cut and etched with heat, and the etched surface was observed with a scanning electron microscope to photographically determine the average particle size. The grain boundaries were observed with a transmission electron microscope to check the presence of the grain boundary phase and to determine the thickness of the phase if it exists. The results are shown in Table 1.

The compositions of the particles themselves and grain boundaries were determined with an analytical transmission electron microscope. As a result, it is confirmed that each particle has a uniform composition, individual particles have the same composition, and the grain boundary phase has a different composition from the particles. Transmission electron microscopy of the ceramic particles shows that each particle does not have a core-shell structure, but has a uniform crystal structure and individual particles have the same crystal structure.

Electrical characteristics of the resulting multilayer ceramic capacitors were determined. The electrostatic capacitance and dielectric loss of each capacitor were measured at a frequency of 1 kHz, a voltage of 1 Vrms and a temperature of 25° C. The dielectric constant was calculated from the electrostatic capacitance. The insulation resistance at 25° C. was measured by applying a direct current voltage of 10 V to determine the resistivity. Rates of change in electrostatic capacitance (or dielectric constant) at 85° C. and 125° C. were determined relative to the standard temperature of 25° C. Further, the rate of change in electrostatic capacitance (or dielectric constant) was determined by applying a direct current bias of 3 kV/mm with reference to a standard electrostatic capacitance without bias. Results are shown in Table 2.

TABLE 2

|  | Sample number | Dielectric constant | Dielectric loss (%) | Resistivity ($\Omega \times cm$) | Rate of change in dielectric constant (%, standard: 25° C.) | | Rate of change in dielectric constant (%) at d.c. voltage bias (3 kv/mm) |
| --- | --- | --- | --- | --- | --- | --- | --- |
|  |  |  |  |  | 85° C. | 125° C. |  |
| Examples | 1 | 1500 | 3.5 | 12.50 | −2.4 | −8.6 | −15.2 |
|  | 2 | 2000 | 4.0 | 12.65 | −3.5 | −9.7 | −15.3 |
|  | 3 | 2600 | 5.0 | 12.45 | −7.6 | −13.6 | −16.7 |

TABLE 2-continued

|  | Sample number | Dielectric constant | Dielectric loss (%) | Resistivity (Ω × cm) | Rate of change in dielectric constant (%, standard: 25° C.) | | Rate of change in dielectric constant (%) at d.c. voltage bias (3 kv/mm) |
| --- | --- | --- | --- | --- | --- | --- | --- |
|  |  |  |  |  | 85° C. | 125° C. |  |
|  | 4 | 1800 | 4.0 | 12.55 | −4.4 | −8.8 | −14.3 |
|  | 5 | 1950 | 3.5 | 12.76 | −4.4 | −11.5 | −14.6 |
|  | 6 | 2000 | 3.5 | 12.55 | −6.5 | −13.0 | −14.5 |
|  | 7 | 1400 | 2.2 | 13.00 | −3.6 | −7.6 | −12.4 |
| Comparative | 8 | 2300 | 7.5 | 12.85 | −2.5 | 28.2 | −25.8 |
| Examples | 9 | 3300 | 8.8 | 12.35 | −4.5 | 42.5 | −40.6 |
|  | 10 | 550 | 2.5 | 13.10 | −0.3 | −5.3 | −12.4 |

The observations and results set forth above illustrate that each ceramic dielectric in accordance with the present invention has a maximum particle size of 0.5 μm and an average particle size of 0.1 to 0.3 μm and each particle has a uniform composition and crystal system. In each of Sample Nos. 5 to 7, a grain boundary phase having a thickness of 0.5 to 5.0 nm with a different composition from the particles is formed.

The multilayer ceramic capacitor comprising the nonreducing dielectric ceramic in accordance with the present invention shows a low rate of change in dielectric constant (less than 15%) at 125° C. and dielectric characteristics which satisfy the X7R characteristics. The rate of change in dielectric constant when applying a direct current bias is satisfactorily low (less than 20%).

In contrast, at a maximum particle size of over 0.5 μm as shown in Sample No. 8, the dielectric loss increases more than 5%, the rate of change in dielectric constant with temperature increases more than 15%, and the rate of change in dielectric constant when applying a direct current bias increases more than 20%. At an average particle size of over 0.3 μm and a maximum particle size of over 0.5 μm as shown in Sample No. 9, the dielectric loss increases more than 5%, the rate of change in dielectric constant with temperature increases more than 15%, and the rate of change in dielectric constant when applying a direct current bias increases more than 20%. At a grain boundary phase thickness of over 5.0 nm as shown in Sample No. 10, the dielectric constant decreases, although the rate of change in dielectric constant with temperature and the rate of change in dielectric constant when applying a direct current bias are satisfactory.

Each sample was subjected to a reliability test in which a direct current voltage of 18 volts was applied at a temperature of 150° C. for 1,000 hours. Characteristics such as insulation resistance did not deteriorate in the Examples in accordance with the present invention. In contrast, the reliability of Comparative Examples Samples Nos. 8 and 9 were low because the insulation resistances deteriorated due to large particle sizes.

Examples: Sample Nos. 11 through 16

After an appropriate amount of organic solvent was added to starting materials based on the formulations (mole ratios) shown in Table 3, these starting materials were mixed while powdering in a resinous pot with 2 mmφ zirconia powdering media.

TABLE 3

|  | Sample number | Starting materials | mole ratio | | Sintering temp. (°C.) | Particle size (μm) | | Grain boundary phase thickness (nm) |
| --- | --- | --- | --- | --- | --- | --- | --- | --- |
|  |  |  |  |  |  | Average | Maximum |  |
| Examples | 11 | 0.2 μm BaTiO₃ by hydrolytic synthesis |  | 80 | 1150 | 0.2 | 0.3 | — |
|  |  | 0.2 μm Ba(Zr,Ti)O₃ by hydrolytic synthesis |  | 20 |  |  |  |  |
|  |  | Soluble Mn compound | Mn | 0.5 |  |  |  |  |
|  | 12 | 0.2 μm BaTiO₃ by hydrolytic synthesis |  | 80 | 1200 | 0.2 | 0.3 | — |
|  |  | 0.2 μm SrTiO₃ by hydrolytic synthesis |  | 20 |  |  |  |  |
|  |  | Soluble Mn compound | Mn | 0.5 |  |  |  |  |
|  |  | Soluble Mg compound | Mg | 0.5 |  |  |  |  |
|  | 13 | 0.3 μm SrTiO₃ by hydrothermal crystallization |  | 50 | 1150 | 0.3 | 0.5 | — |
|  |  | 0.2 μm CaTiO₃ by hydrothermal crystallization |  | 50 |  |  |  |  |
|  |  | MnCO₃ |  | 0.5 |  |  |  |  |
|  | 14 | 0.1 μm BaTiO₃ by hydrolytic synthesis |  | 90 | 1000 | 0.1 | 0.2 | 0.5 |
|  |  | 0.2 μm Ba(Zr,Ti)O₃ by hydrolytic synthesis |  | 10 |  |  |  |  |
|  |  | Soluble Mn compound | Mn | 0.7 |  |  |  |  |
|  |  | Soluble Li—Ba—Si compound |  | 0.7 |  |  |  |  |
|  | 15 | 0.2 μm Ba(Zr,Ti)O₃ by solid phase reaction |  | 90 | 1050 | 0.25 | 0.4 | 1.0 |
|  |  | 0.2 μm CaTiO₃ by hydrothermal crystallization |  | 10 |  |  |  |  |
|  |  | Soluble Mg compound | Mg | 1.0 |  |  |  |  |
|  |  | Soluble Mn compound | Mn | 0.5 |  |  |  |  |
|  |  | Li—Ba—Si glass |  | 1.0 |  |  |  |  |
|  | 16 | 0.25 μm BaTiO₃ by solid phase reaction |  | 65 | 1000 | 0.3 | 0.4 | 5.0 |
|  |  | 0.3 μm SrTiO₃ by hydrothermal crystallization |  | 30 |  |  |  |  |
|  |  | 0.2 μm CaTiO₃ by hydrothermal crystallization |  | 5 |  |  |  |  |

TABLE 3-continued

| Sample | | | | Sintering | Particle size (μm) | | Grain boundary phase thickness |
|---|---|---|---|---|---|---|---|
| number | Starting materials | | mole ratio | temp. (°C.) | Average | Maximum | (nm) |
| | Soluble Ni compound | Ni | 1.0 | | | | |
| | Soluble Mn compound | Mn | 0.5 | | | | |
| | Soluble B—Ba—Si compound | | 5.0 | | | | |

The starting materials in each sample are as follows:

Sample No. 11: barium titanate (BaTiO$_3$) which was prepared by hydrolytic reaction with an average particle size of 0.2 μm, barium titanate-zirconate {Ba(Zr,Ti)O$_3$} with an average particle size of 0.2 μm and a Mn compound soluble in the organic solvent used in the mixing/powdering process, in which barium titanate-zirconate was prepared by mixing and calcining barium titanate (BaTiO$_3$) and barium zirconate (BaZrO$_3$) which were prepared by hydrolytic reaction in a mole ratio of 7/3.

Sample No. 12: barium titanate (BaTiO$_3$) which was prepared by hydrolytic reaction with an average particle size of 0.2 μm, strontium titanate (SrTiO$_3$) which was prepared by hydrolytic reaction with an average particle size of 0.2 μm, and Mn and Mg compounds soluble in the organic solvent used in the mixing/powdering process.

Sample No. 13: strontium titanate (SrTiO$_3$) which was prepared by a hydrothermal crystallization method with an average particle size of 0.3 μm, calcium titanate (CaTiO$_3$) which was prepared by a hydrothermal crystallization method with an average particle size of 0.2 μm and fine manganese carbonate powder.

Sample No. 14: barium titanate (BaTiO$_3$) which was prepared by hydrolytic reaction with an average particle size of 0.1 μm, barium titanate-zirconate {Ba(Zr,Ti)0$_3$} with an average particle size of 0.2 μm, a Mn compound and a Li—Ba—Si compound which were soluble in the organic solvent used in the mixing/powdering process, in which the barium titanate-zirconate was prepared by mixing and calcinating barium titanate (BaTiO$_3$) and barium zirconate (BaZrO$_3$) which were prepared by hydrolytic reaction in a mole ration of 7/3.

Sample No. 15: barium titanate-zirconate {Ba(Zr,Ti)0$_3$} prepared by solid phase reaction with an average particle size of 0.2 μm, calcium titanate (CaTiO$_3$) prepared by hydrothermal crystallization method with an average particle size of 0.2 μm, Mg and Mn compounds soluble in the organic solvent used in the mixing/powdering process and Li—Ba—Si glass powder, in which the barium titanate zirconate was prepared by mixing barium carbonate, titanium oxide and zirconium oxide so that the mole ratio of Ba/(Ti+Zr) was 1 and that of Ti/Zr was 7/3, followed by calcinating and powdering.

Sample No. 16: barium titanate (BaTiO$_3$) prepared by solid phase reaction having an average diameter of 0.25 μm, strontium titanate prepared by a hydrothermal crystallization method with an average diameter of 0.3 μm, calcium titanate (CaTiO$_3$) prepared by a hydrothermal crystallization method with an average diameter of 0.2 μm, a Ni compound, a Mn compound and a B—Ba—Si compound which were soluble in the organic solvent used in the mixing/powdering process, in which the barium titanate was prepared by mixing barium carbonate and titanium oxide so that the mole ratio of Ba/Ti was 1, followed by calcinating and powdering.

Compounds soluble in an organic solvent include alkoxides and acetylacetonates of the corresponding metals and metallic soaps.

A slurry was prepared by adding a predetermined amount of organic binder to each powdered mixture and shaped into a thin ceramic sheet on an organic film with a doctor blade so that the thickness after sintering was 2 μm. Next, a conductive layer essentially consisting of nickel was formed on the ceramic green sheet by printing. Six ceramic green sheets with conductive layers were overlapped such that extraction sites of their conductive layers alternate and were intercalated with two ceramic green sheets without internal electrodes to form a laminate.

The laminate was heated in a nitrogen atmosphere to remove the binder and sintered in a reducing atmosphere at a sintering temperature as shown in Table 3 to form a ceramic sintered compact. A silver paste-containing glass frit was coated and baked on both sides of the ceramic sintered compact to provide external electrodes. A multilayer ceramic capacitor comprising nonreducing dielectric ceramic layers was prepared in such a manner.

Comparative Examples: Sample Nos. 17 through 20

After an appropriate amount of organic solvent was added to starting materials based on the formulations (mole ratios) shown in Table 4, these starting materials were mixed while powdering in a resinous pot with 2 mmϕ zirconia powdering media.

TABLE 4

| | Sample | | | | Sintering | Particle size (μm) | | Grain boundary phase thickness |
|---|---|---|---|---|---|---|---|---|
| | number | Starting materials | | mole ratio | temp. (°C.) | Average | Maximum | (nm) |
| Comparative Examples | 17 | 0.5 μm BaTiO$_3$ by hydrothermal crystallization | | 90 | 1200 | 0.5 | 1.0 | — |
| | | 0.2 μm Ba(Zr,Ti)O$_3$ by hydrolytic synthesis | | 10 | | | | |
| | | Soluble Mn compound | Mn | 0.5 | | | | |
| | | Soluble B—Ba—Si compound | | 5.0 | | | | |

TABLE 4-continued

| Sample number | Starting materials | mole ratio | | Sintering temp. (°C.) | Particle size (μm) | | Grain boundary phase thickness (nm) |
|---|---|---|---|---|---|---|---|
| | | | | | Average | Maximum | |
| 18 | 0.1 μm BaTiO₃ by hydrothermal crystallization | | 80 | 1250 | 0.8 | 1.5 | — |
| | 0.1 μm Ba(Zr,Ti)O₃ by hydrothermal crystallization | | 20 | | | | |
| | Soluble Mn compound | Mn | 0.5 | | | | |
| 19 | 0.25 μm BaTiO₃ by solid phase reaction | | 65 | 1000 | 0.3 | 0.5 | 7.0 |
| | 0.3 μm SrTiO₃ by hydrothermal crystallization | | 30 | | | | |
| | 0.2 μm CaTiO₃ by hydrothermal crystallization | | 5 | | | | |
| | Soluble Mn compound | Mn | 0.5 | | | | |
| | Soluble B—Ba—Si compound | | 6.0 | | | | |
| 20 | 0.2 μm Ba(Zr,Ti)O₃ by solid phase reaction | | 90 | 1200 | 0.5 | 0.8 | 1.0 |
| | 0.2 μm CaTiO₃ by hydrothermal crystallization | | 10 | | | | |
| | Soluble Mn compound | Mn | 0.5 | | | | |
| | Li—Ba—Si glass | | 2.0 | | | | |

The starting materials in each sample are as follows:

Sample No. 17: barium titanate (BaTiO₃) which was prepared by a hydrothermal crystallization method with an average particle size of 0.5 μm, barium titanate-zirconate {Ba(Zr,Ti)0₃} with an average particle size of 0.2 μm, a Mn compound soluble in the organic solvent used in the mixing/powdering process and a B—Ba—m Si compound, in which the barium titanate-zirconate was prepared by mixing and calcinating barium titanate (BaTiO₃) and barium zirconate (BaZrO₃) which were prepared by hydrolytic reaction in a mole ratio of 7/3.

Sample No. 18: barium titanate (BaTiO₃) which was prepared by a hydrothermal crystallization method with an average particle size of 0.1 μm, barium titanate-zirconate {Ba(Zr,Ti)0₃} with an average particle size of 0.1 μm, and a Mn compound soluble in the organic solvent used in the mixing/powdering process, in which barium titanate-zirconate was prepared by mixing and calcinating barium titanate (BaTiO₃) and barium zirconate (BaZrO₃) which were prepared by hydrolytic reaction in a mole ratio of 7/3.

Sample No. 19: barium titanate (BaTiO₃) prepared by solid phase reaction having an average diameter of 0.25 μm, strontium titanate prepared by a hydrothermal crystallization method with an average diameter of 0.3 μm, calcium titanate (CaTiO₃) prepared by a hydrothermal crystallization method with an average diameter of 0.2 μm, a Mn compound soluble in the organic solvent used in the mixing/powdering process and a B—Ba—Si compound, in which the barium titanate was prepared by mixing barium carbonate and titanium oxide so that the mole ratio of Ba/Ti was 1, followed by calcinating and powdering.

Sample No. 20: barium titanate-zirconate {Ba(Zr,Ti)0₃} prepared by solid phase reaction with an average particle size of 0.2 μm, calcium titanate (CaTiO₃) prepared by hydrothermal crystallization method with an average particle size of 0.2 μm, a Mn compound soluble in the organic solvent used in the mixing/powdering process and Li—Ba—Si glass powder, in which the barium titanate zirconate was prepared by mixing barium carbonate, titanium oxide and zirconium oxide so that the mole ratio of Ba/(Ti+Zr) was 1 and that of Ti/Zr was 7/3, followed by calcinating and powdering.

Multilayer ceramic capacitors comprising nonreducing dielectric ceramic layers were prepared at sintering temperatures shown in Table 4 under the same conditions as in the Example Samples 11—16.

Particles and grain boundaries of the resulting multilayer ceramic capacitors in the Examples and Comparative Examples were observed. Each multilayer ceramic capacitor was cut and etched with heat, and the etched surface was observed with a scanning electron microscope to photographically determine the average particle size. The grain boundaries were observed with a transmission electron microscope to check the presence of the grain boundary phase and to determine the thickness of the phase if it exists. Results are shown in Tables 3 and 4.

The compositions of the particles themselves and grain boundaries were determined with an analytical transmission electron microscope. As a result, it is confirmed that there are at least two kinds of particles with different compositions, each particle has a uniform composition, and the grain boundary phase has a different composition from the particles. Transmission electron microscopy of the ceramic particle shows that each particle does not have a core-shell structure, but has a uniform crystal structure.

Electrical characteristics of the resulting multilayer ceramic capacitors were determined. The electrostatic capacitance and dielectric loss of each capacitor were measured at a frequency of 1 kHz, a voltage of 1 Vrms and a temperature of 25° C. The dielectric constant was calculated from the electrostatic capacitance. The insulation resistance at 25° C. was measured by applying a direct current voltage of 10 V to determine the resistivity. Rates of change in electrostatic capacitance (or dielectric constant) at 85° C. and 125° C. were determined to a standard temperature of 25° C. Further, the rate of change in electrostatic capacitance (or dielectric constant) was determined by applying a direct current bias of 3 kV/mm with reference to a standard electrostatic capacitance without bias. Results are shown in Table 5.

TABLE 5

| | Sample number | Dielectric constant | Dielectric loss (%) | Resistivity (W × cm) | Rate of change in dielectric constant (%, standard: 25° C.) | | Rate of change in dielectric constant (%) at d.c. voltage bias (3 kv/mm) |
|---|---|---|---|---|---|---|---|
| | | | | | 85° C. | 125° C. | |
| Example | 11 | 1800 | 3.5 | 12.85 | −4.4 | −10.5 | −14.5 |
| | 12 | 1600 | 2.0 | 12.74 | −3.5 | −10.3 | −14.6 |
| | 13 | 700 | 1.4 | 12.55 | −2.6 | −4.6 | −7.5 |
| | 14 | 2100 | 4.0 | 12.97 | −8.3 | −14.2 | −15.0 |
| | 15 | 2050 | 3.5 | 12.86 | −8.4 | −14.5 | −14.5 |
| | 16 | 1630 | 3.5 | 12.75 | −6.5 | −13.0 | −13.6 |
| Comparative Example | 17 | 2800 | 7.4 | 12.96 | −6.9 | −30.8 | −26.4 |
| | 18 | 2400 | 7.5 | 12.85 | 15.6 | −40.8 | −51.3 |
| | 19 | 550 | 1.5 | 12.85 | −3.5 | −12.5 | −14.2 |
| | 20 | 1850 | 3.5 | 12.90 | −7.6 | −14.6 | −45.5 |

The observations and results set forth above illustrate that each ceramic dielectric in accordance with the present invention has a maximum particle size of 0.5 μm and an average particle size of 0.1 to 0.3 μm and comprises at least two kinds of particles with different compositions, and each particle has a uniform composition and crystal system. In each of Sample Nos. 14 to 16, a grain boundary phase having a thickness of 0.5 to 5.0 nm with a different composition from the particles is formed.

The multilayer ceramic capacitor comprising the nonreducing dielectric ceramic in accordance with the present invention shows a low rate of change in dielectric constant (less than 15%) at 125° C. and dielectric characteristics which satisfy the X7R characteristics. The rate of change in dielectric constant when applying a direct current bias is satisfactorily low (less than 20%).

In contrast, at a maximum particle size of over 0.5 μm as shown in Sample Nos. 17, 18 and 20, the rate of change in dielectric constant when applying a direct current bias increases more than 20%. In Sample Nos. 17 and 18, the dielectric loss increases more than 5%, and the rate of change in dielectric constant with temperature increases more than 15%. For a grain boundary phase thickness of over 5.0 nm as shown in Sample No. 19, the dielectric constant decreases, although the rate of change in dielectric constant with temperature and the rate of change in dielectric constant when applying a direct current bias are satisfactory.

Each sample was subjected to a reliability test in which a direct current voltage of 18 volts was applied at a temperature of 150° C. for 1,000 hours. Characteristics such as insulation resistance did not deteriorate in the Examples in accordance with the present invention. In contrast, the reliability of Comparative Examples in Sample Nos. 17 and 18 were low because the insulation resistances deteriorated due to large particle sizes.

Alkoxides and acetylacetonate of various metals and metal soaps were used as compounds soluble in an organic solvent which was used for mixing and powdering raw materials in the Examples and Comparative Examples. When using water as the solvent, water soluble compounds such as nitrates, acetates, borates and chlorides may be used.

It is preferred that sintering be performed in a reducing atmosphere as shown in the Examples set forth above because sintering in an air atmosphere promotes growth of ceramic particles, resulting in an increased rate of change in dielectric constant with temperature and the increased rate of change in dielectric constant when applying a direct current bias.

Silver is used for external electrodes in the Examples set forth above, and the use of a base metal is also preferable due to excellent electrical contact with internal electrodes comprising a base metal.

In Sample Nos. 1 through 3, 11 and 12, compositions in which the mole ratios of barium to titanium in $BaTiO_3$ deviate from the respective stoichiometric value were tested. In Sample No. 13, a composition in which the mole ratio of strontium to titanium in $SrTiO_3$ deviate from the respective stoichiometric value was also tested. No significant differences in their sintering characteristics and properties of the resulting sintered compacts were found.

In the Examples set forth above, multilayer ceramic capacitors were illustrated as an embodiment of monolithic ceramic electronic parts. It was found that other monolithic ceramic electronic parts such as monolithic ceramic substrates also have satisfactory characteristics.

What is claimed is:

1. A dielectric ceramic comprising a sintered ceramic compact composed of a plurality of particles having a maximum diameter of about 0.5 μm and an average diameter of about 0.1 to 0.3 μm.

2. A dielectric ceramic according to claim 1 wherein each of said plurality of particles has a uniform composition and a uniform crystal system, and individual ones of said particles having the same composition and crystal system.

3. A dielectric ceramic according to claim 2 further comprising a grain boundary phase having a different composition from said individual particles.

4. A dielectric ceramic according to claim 3, wherein the thickness of said grain boundary phase is about 5 nm or less.

5. A dielectric ceramic according to claim 1 wherein said maximum diameter is about 0.4 μm and said average diameter is about 0.15 to 0.25 μm.

6. A dielectric ceramic according to claim 5 wherein each of said plurality of particles has a uniform composition and a uniform crystal system, and individual ones of said particles having the same composition and crystal system.

7. A dielectric ceramic according to claim 6 further comprising a grain boundary phase having a different composition from said individual particles.

8. A monolithic ceramic electronic part comprising:
   a ceramic layer comprising a sintered ceramic compact composed of a plurality of particles having a maximum diameter of about 0.5 μm and an average diameter of about 0.1 to 0.3 μm; and
   a first conductor associated with said ceramic layer.

9. A monolithic ceramic electronic part according to claim 8 further comprising a second conductor electrically connected to said first conductor and accessible from the exterior of said part.

10. A dielectric ceramic electronic part according to claim 8, wherein each of said plurality of particles has a uniform composition and a uniform crystal system, and said sintered ceramic compact comprising at least two kinds of said particles having different compositions.

11. A dielectric ceramic electronic part according to claim 10, wherein said plurality of particles further comprise a grain boundary phase having a different composition from said plurality of particles.

12. A dielectric ceramic electronic part according to claim 11, wherein the thickness of said boundary phase is about 5 nm or less.

13. A monolithic ceramic electronic part according to claim 8 wherein said first conductor comprises a base metal.

14. A monolithic ceramic electronic part according to claim 13, said ceramic layer is a nonreducing ceramic.

15. A monolithic ceramic electronic part comprising:

a ceramic layer comprising a sintered ceramic compact composed of a plurality of particles having a maximum diameter of about 0.4 μm and an average diameter of about 0.15 to 0.25 μm; and a first conductor associated with said ceramic layer.

16. A monolithic ceramic electronic part according to claim 15 further comprising a second conductor electrically connected to said first conductor and being accessible from the exterior of said part.

17. A dielectric ceramic electronic part according to claim 15, wherein each of said plurality of particles has a uniform composition and a uniform crystal system, and said sintered ceramic compact comprising at least two kinds of said particles having different compositions.

18. A monolithic ceramic electronic part according to claim 15 wherein said first conductor comprises a base metal.

19. A monolithic ceramic electronic part according to claim 18, said ceramic layer is a nonreducing ceramic.

* * * * *